July 18, 1950  C. A. LOUCKS  2,515,351
SEED FEEDING DEVICE
Filed April 13, 1946  2 Sheets-Sheet 1
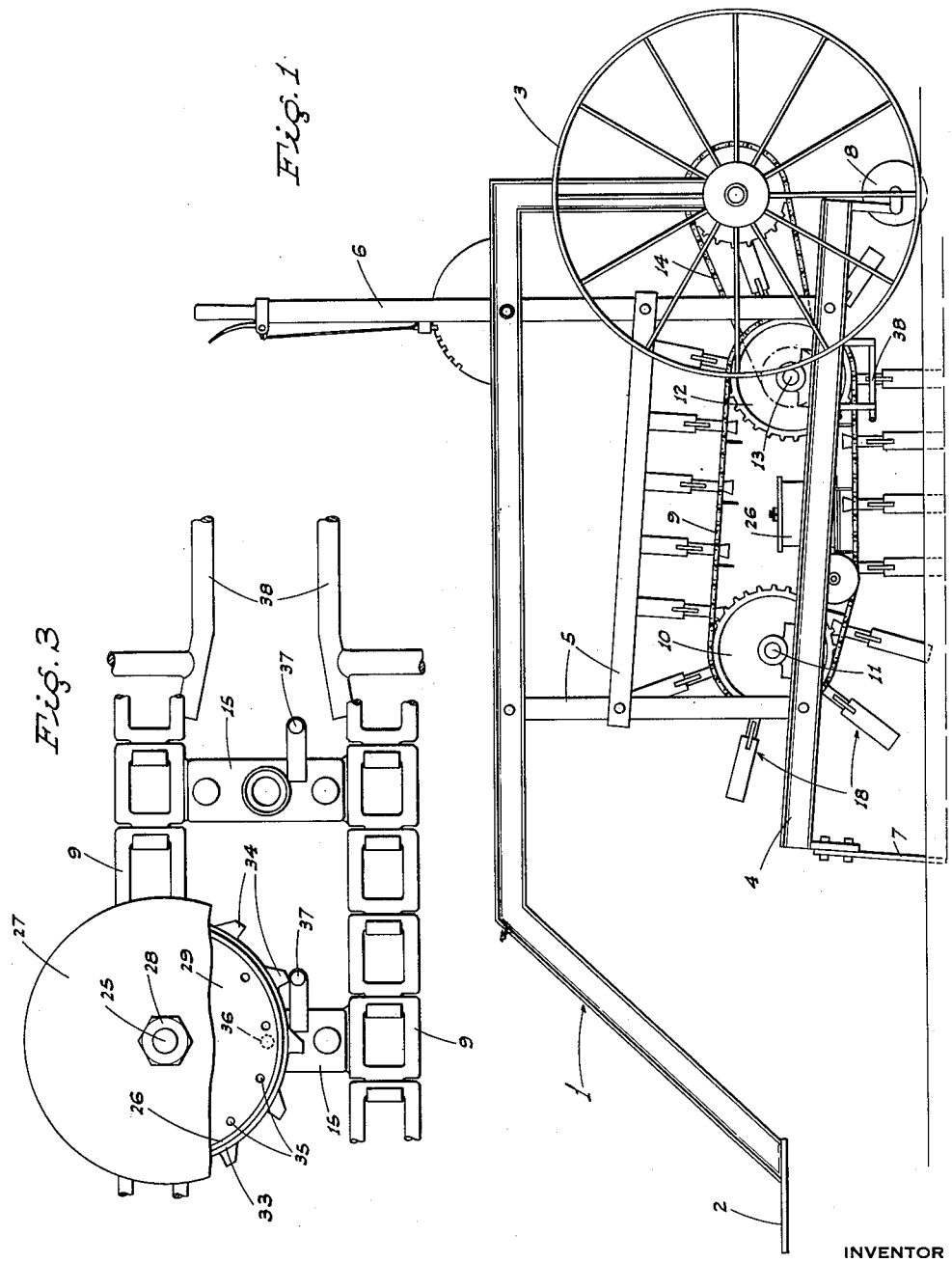
INVENTOR
C. A. Loucks
BY
ATTORNEYS

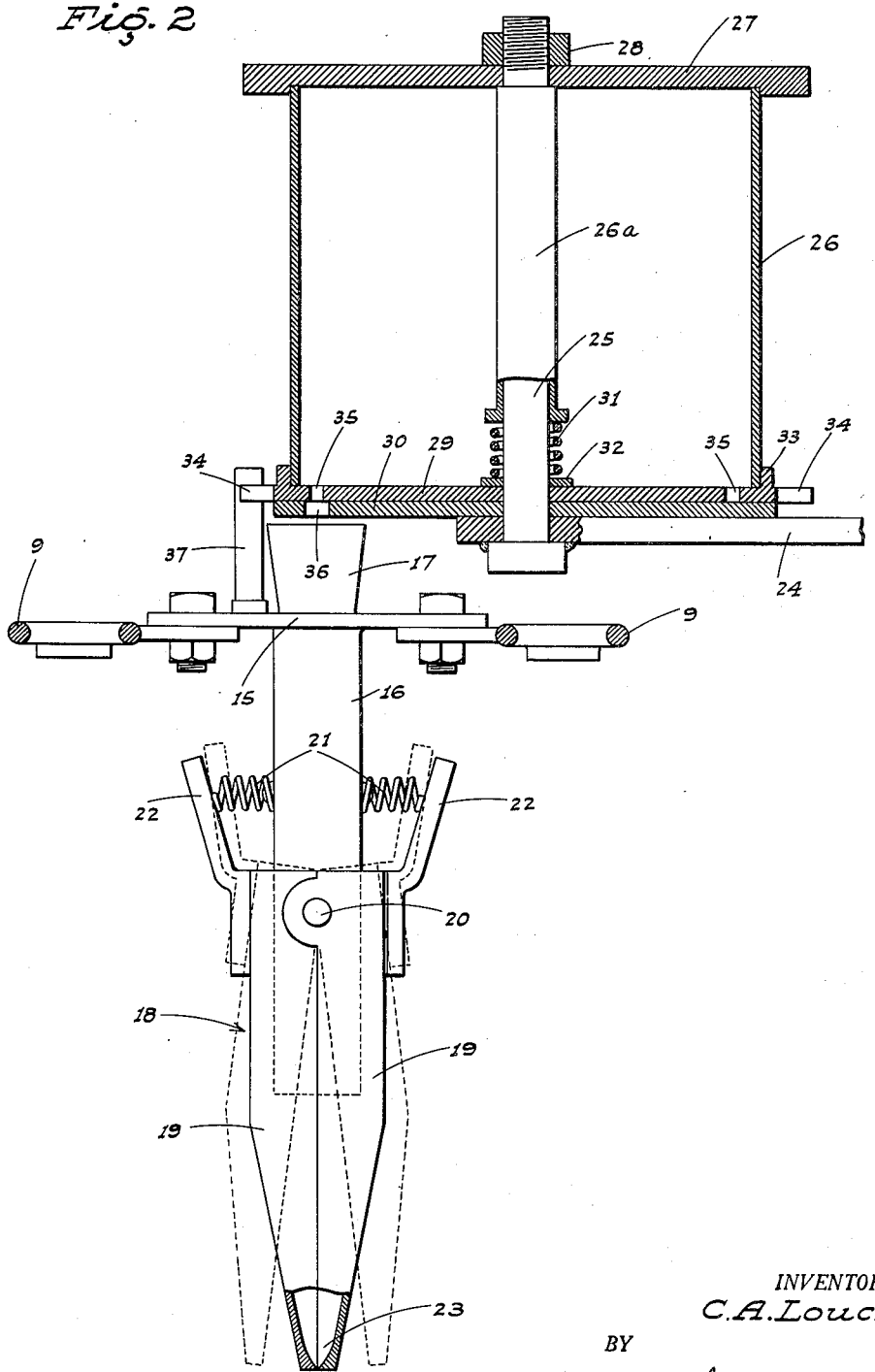

Patented July 18, 1950

2,515,351

UNITED STATES PATENT OFFICE 2,515,351

SEED FEEDING DEVICE

Claude A. Loucks, Solano County, Calif., assignor of one-half to Albert M. Jongeneel Application April 13, 1946, Serial No. 662,021

5 Claims. (Cl. 111—89)

This invention relates in general to improvements in seed planters.

In particular the present invention is directed to, and features, a novel seed feeding device for a planter of the type which plants seeds one at a time along a row and in predetermined spaced relation.

This invention represents a modification of the seed feeding device shown in copending United States patent application, Serial No. 608,152, on Seed Planter, which matured into Patent No. 2,503,828, granted April 11, 1950.

The seed feeding device here shown is simplified in structure, positive in operation, rugged, and practical; yet exceedingly effective for the purpose for which it is designed.

These objects are accomplished by means of such structure and relative arrangement of parts as will fully appear by a perusal of the following specification and claims.

In the drawings:

Fig. 1 is a side elevation of a seed planter embodying the seed feeding device.

Fig. 2 is an enlarged transverse elevation, mainly in section, of the seed feeding device as cooperating with one of the seed tubes.

Fig. 3 is an enlarged plan view of the feeding device as in use, and partly broken away.

Referring now more particularly to the characters of reference on the drawings, the seed planting machine in connection with which the seed feeding device is used is here shown as comprising an arched main frame 1 provided at the forward end with a hitch 2 adapted for connection with a tractor in draft relation; said main frame being supported, at the rear, by a transversely spaced pair of ground engaging wheels 3.

A longitudinally extending sub-frame 4 is vertically adjustably suspended from the main frame 1 by means of a suspension linkage assembly 5 which includes an upstanding hand lever 6. The lever 6 provides means whereby a sub-frame 4 may be vertically adjusted.

The sub-frame 4 is fitted at its forward end with a furrow opener 7, and at its rear end with a furrow closing disc 8.

Intermediate its ends the sub-frame 4 supports an endless planting mechanism constructed as follows:

A pair of transversely spaced, longitudinally extending endless chains 9 are supported, at opposite ends, by transversely spaced front sprockets 10 on a cross shaft 11, and transversely spaced rear sprockets 12 on a cross shaft 13. The cross shaft 13 is driven from one of the wheels 3 by an endless chain and sprocket unit 14 designed to drive the chains 9 at a speed such that the lower runs thereof move exactly at ground speed of the machine but in an opposite direction.

At evenly spaced points the chains 9 are connected by cross bars 15, and each of said cross bars is fitted, centrally of its end, with a radially outwardly projecting neck or seed tube 16; each seed tube including a funnel or chute 17 projecting in an opposite direction from the other side of the corresponding cross bar 15; i. e. in an upward direction when the tubes 16 are traveling with the lower run of the chain assembly. The seed tubes 16 are fitted on the outer end of each thereof with an outwarly projecting seed depositing shoe, indicated generally at 18. Each such shoe is hollow, open at its inner end, pointed and normally closed at its outer end, and formed of a pair of matching substantially half-round segments 19. The segments 19 are pivoted, at their inner ends, as at 20, to the outer end of the corresponding seed tube 16 for lateral swinging movement of said segments between closed position, as shown in full lines in Fig. 2, to the open position shown in dotted lines in said figure. The segments 19 are normally held in closed position by compression springs 21, which engage between the corresponding seed tube 16 and cam fingers 22 fixed on the inner ends of the segments 19 and projecting lengthwise thereof toward the chain assembly. When the segments 19 are closed, a seed retaining pocket 23 is formed in the outer end of each shoe.

The seed feeding device to which the instant invention is mainly directed is constructed and functions as follows:

A rigid supporting bracket 24 projects laterally inwardly from one side of the sub-frame 4 and is fitted, adjacent its inner end, with an upstanding center post 25; said center post being offset laterally from the longitudinal path of movement of the seed tubes 16, and in a horizontal plane mainly above the funnels or chutes 17 when the same are traveling with the lower run of the chain assembly.

The center post 25 is surrounded, in concentric relation, by an upstanding cylindrical container 26 which includes a removable cover plate 27 held in place on said container by a nut 28 threaded on a stud formed on the upper end of said post. The bottom of the cylindrical container is a two-part arrangement, and comprises a rotary feeder plate 29 surrounding the center post 25 in turnable relation and resting on top of a base plate 30 fixed in non-turnable relation on the bracket 24. The rotary feeder plate 29 is maintained in close frictional engagement with the base plate 30 by means of a compression spring 31 surrounding the post 25 between the lower end of a sleeve 26a on said post and a washer 32 which bears against said feeder plate 29.

The rotary feeder plate 29 projects at the periphery outwardly of the cylindrical container 26 and includes an upstanding guide flange 33.

Outwardly of the flange 33 the rotary feeder plate 29 is formed with a plurality of radially outwardly projecting, equally circumferentially spaced driving lugs 34. Within the container 26, but in radial alinement with the driving lugs 34, the rotary feeder plate 29 is formed with a circular row of seed receiving openings 35; said openings being relatively close to the side wall of the container 26.

The base plate 30 is formed with a single somewhat larger opening 36 therethrough in position to be successively registered with the seed receiving openings 34 upon rotation of the feeder plate 29. Additionally, the opening 36 is disposed so that the funnels or chutes 17 pass directly thereunder.

To the side of each funnel or chute 17 opposite the bracket 24 each cross bar is fitted with an upstanding, actuating finger 37.

*Operation*

When the seed planting machine is in operation, the seed feeding device functions as follows:

As each seed tube 16 and its funnel or chute 17 travel with the lower run of the chain assembly, said hoppers pass directly under the opening 36. When this occurs the corresponding actuating finger 37 engages an adjacent one of the driving lugs 34 and rotates the feeder plate 29 so that the corresponding seed receiving opening 35 then moves from a position ahead of the opening 36 to register with the latter and passes the same to come to rest again out of register with said opening 36. The openings 35 of the rotary feeder plate 29 always have a seed therein from the container 26, which container is filled with seeds. Thus, with each step-by-step rotative movement of the feeder plate 19 into and then out of register with the opening 36, by passage of an actuating finger 37 as described, one seed falls through the opening 36 and into the then passing funnel or chute 17. In this manner a seed is fed into and passes downwardly through each seed tube 16 as the latter travels beneath the seed feeding unit.

When a seed is delivered into a seed tube 16 it falls into the seed pocket 23 of the corresponding shoe 18. After a seed is delivered into each shoe 18, as the latter moves rearwardly with the lower run of the chain assembly, said shoes are opened at a predetermined point rearwardly of the seed feeding unit by means of a cam rod assembly 38 suspended from the sub-frame 4. The cam rod assembly includes transversely spaced cam rods diverging lateraly outwardly from their forward ends, as shown, whereby when the shoes run through said cam assembly the cam fingers 22 are depressed laterally inwardly, opening the shoe and permitting the seed to fall from the pocket 23 into the furrow. The cam fingers escape the cam assembly 38 at its rear end, whereby said shoes again close for reception of another seed when the shoes again pass beneath the seed feeding device.

The described seed feeding device provides an effective and practical means of delivering seeds one at a time into each shoe 18 with passage of the latter along the lower run of the chain assembly, and ahead of the planting point.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. A seed feeding device for a seed planting machine, comprising a support, an upstanding seed container mounted on the support including a base plate, a post upstanding centrally from the base plate in the container, a feeder plate rotatably mounted on the base plate and surrounding the post in the container and being freely turnable about said post, the feeder plate having a circumferential row of spaced seed receiving openings therethrough, the base plate having a seed passage opening therethrough with which the openings of the row successively register upon rotation of the feeder plate, and means operative to cause step by step rotation of the latter to effect said successive registry of said openings; a stop shoulder about the post above the feeder plate, and a loaded compression spring surrounding the post between the stop shoulder and said feeder plate.

2. A seed feeding device for a seed planting machine comprising a support, a base plate fixed stationary on the support, a seed passage opening in said base plate, an upstanding post fixed stationary with respect to said base plate, a feeder plate mounted in face to face relation with the base plate, said feeder plate surrounding the post and being freely rotatable about said post, means whereby said feeder plate may be rotated, the feeder plate having a circumferentially disposed row of spaced seed receiving openings therein arranged to be brought successively into register with the opening in the base plate with the rotation of said feeder plate, an upstanding flange on the feeder plate adjacent the outer periphery thereof, a seed container shell mounted on the feeder plate and projecting inside said flange, a cover on the shell, the post projecting through said cover, means on the upper end of the post for securing the cover in place on the shell, a sleeve on the post below the cover, and a compression spring interposed between the sleeve and feeder plate.

3. In a seed planting mechanism which includes a supporting frame mounted for movement over the ground, an endless driven conveyor supported on the frame, the lower run of which conveyor moves in a direction opposite to that in which the frame moves, and a plurality of spaced seed depositing shoes mounted on the conveyor; a feeding means for depositing a seed in each shoe as it passes a point in its travel along the frame, such feeding means comprising a container fixed on the frame above the lower run of the conveyor and adjacent said point, the container including a base plate having a single seed passage opening therethrough at said point, the shoes having upper open ends and such open ends passing successively under the opening as the shoes pass said point, the container further including a rotatable seed feeder plate mounted in face to face relation with the base plate and provided with a plurality of concentric seed receiving openings therethrough so disposed as to successively register with such single opening in the base plate with the rotation of said feeder plate, and means mounted on the conveyor and operatively connected with the feeder plate and effective to bring one of the openings in the feeder plate into register with the opening in the base plate simultaneously with the passing of a shoe thereunder whereby to feed a seed into the passing shoe.

4. In a seed planting mechanism which includes a supporting frame mounted for movement over the ground, an endless driven conveyor supported on the frame, the lower run of which conveyor moves in a direction opposite to that in which the frame moves, and a plurality of spaced seed depositing shoes mounted on the conveyor; a feeding means for depositing a seed in each shoe as it passes a point in its travel along the frame, such feeding means comprising a container fixed on the frame above the lower run of the conveyor and adjacent said point, the container including a base plate having a single seed passage opening therethrough at said point, the shoes having upper open ends and such open ends passing successively under the opening as the shoes pass said point, the container further including a rotatable seed feeder plate mounted in face to face relation with the base plate and provided with a plurality of concentric seed receiving openings therethrough so disposed as to successively register with such single opening in the base plate with the rotation of said feeder plate, the periphery of said feeder plate projecting outside the container, a plurality of driving lugs equally spaced about the periphery of the feeder plate, and a finger supported from the conveyor adjacent each shoe and engageable with one of said lugs to move the feeder plate and bring one of the openings therein into register with the single opening in the base plate as the adjacent shoe moves under the said single opening.

5. In a seed planting mechanism which includes a supporting frame mounted for movement over the ground, an endless driven conveyor supported on the frame, the lower run of which conveyor moves in a direction opposite to that in which the frame moves, and a plurality of spaced seed depositing shoes mounted on the conveyor; a feeding means for depositing a seed in each shoe as it passes a point in its travel along the frame, such feeding means comprising a container fixed on the frame above the lower run of the conveyor and adjacent said point, the container including a base plate having a single seed passage opening therethrough at said point, the shoes having upper open ends and such open ends passing successively under the opening as the shoes pass said point, the container further including a rotatable seed feeder plate mounted in face to face relation with the base plate and provided with a plurality of concentric seed receiving openings therethrough so disposed as to successively register with such single opening in the base plate with the rotation of said feeder plate, the periphery of said feeder plate projecting outside the container, a plurality of driving lugs equally spaced about the periphery of the feeder plate, the driven conveyor comprising two spaced apart chains, a plurality of equally spaced cross bars supported across the chains, one shoe being supported on each cross bar, and an actuator finger on each cross bar positioned to engage and advance one of said lugs whereby to rotate the feeder plate and bring one of said openings therein into register with the single opening in the base plate as the adjacent shoe moves under said opening.

CLAUDE A. LOUCKS.

REFERENCES CITED

The following references are of record in the file of this patent:

UNITED STATES PATENTS

| Number | Name | Date |
|---|---|---|
| 254,444 | Vogel et al. | Feb. 28, 1882 |
| 298,761 | Lind | May 20, 1884 |
| 361,463 | Southwick | Apr. 19, 1887 |
| 439,773 | Cole | Nov. 4, 1890 |
| 534,361 | Courtney | Feb. 19, 1895 |
| 631,358 | Campbell | Aug. 22, 1899 |
| 874,155 | Beaman | Dec. 17, 1907 |
| 1,105,075 | Greene | July 28, 1914 |
| 1,464,464 | Wright | Aug. 7, 1923 |
| 1,527,570 | Morphew | Feb. 24, 1925 |
| 1,802,273 | Richards et al. | Apr. 21, 1931 |

FOREIGN PATENTS

| Number | Country | Date |
|---|---|---|
| 530,439 | Germany | July 29, 1931 |
| 704,740 | Germany | Apr. 5, 1907 |